(12) United States Patent
Pelletier et al.

(10) Patent No.: US 9,198,131 B2
(45) Date of Patent: *Nov. 24, 2015

(54) METHOD FOR IMPROVING BATTERY LIFE AND HARQ RETRANSMISSIONS IN WIRELESS COMMUNICATIONS SYSTEMS

(71) Applicant: Telefonaktiebolaget L M Ericsson (publ), Stockholm (SE)

(72) Inventors: Ghyslain Pelletier, Laval (CA); Magnus Stattin, Sollentuna (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/294,265

(22) Filed: Jun. 3, 2014

(65) Prior Publication Data

US 2014/0269397 A1 Sep. 18, 2014

Related U.S. Application Data

(63) Continuation of application No. 13/124,475, filed as application No. PCT/SE2009/050191 on Feb. 20, 2009, now Pat. No. 8,824,347.

(60) Provisional application No. 61/106,337, filed on Oct. 17, 2008.

(51) Int. Cl.
   *H04W 52/02* (2009.01)
   *H04L 1/18* (2006.01)
   *H04W 24/00* (2009.01)

(52) U.S. Cl.
   CPC ......... *H04W 52/0248* (2013.01); *H04L 1/1883* (2013.01); *H04L 1/1887* (2013.01); *H04W 24/00* (2013.01); *H04W 52/0216* (2013.01)

(58) Field of Classification Search
   None
   See application file for complete search history.

(56) References Cited

U.S. PATENT DOCUMENTS

| 8,369,209 B2 | 2/2013 | Zhang et al. |
| 2002/0006119 A1 | 1/2002 | Steudle |

(Continued)

FOREIGN PATENT DOCUMENTS

| WO | 2006103618 A1 | 10/2006 |
| WO | 2008023242 A2 | 2/2008 |
| WO | 2008036366 A2 | 3/2008 |

OTHER PUBLICATIONS

Nokia Corporation, et al., "UL HARQ operation and Measurement Gaps in DRX", Change Request, 3GPP TSG-RAN2 Meeting #64, Prague, Czech Republic, Oct. 8, 2008, pp. 1-3, R2-086084, 3GPP.

(Continued)

*Primary Examiner* — Gary Mui
(74) *Attorney, Agent, or Firm* — Coats & Bennett, PLLC (57) ABSTRACT

Methods and apparatus for controlling discontinuous receiver operation in a wireless communication device are disclosed. In an exemplary embodiment, a wireless communication device configured to monitor a downlink signal during a series of regularly scheduled awake intervals and monitor the downlink signal for retransmissions during retransmission-monitoring intervals scheduled at a first predetermined delay from each detected data transmission to the receiver includes a control circuit configured to detect that a first retransmission-monitoring interval overlaps a previously scheduled radio activity during which the receiver is unavailable to monitor the first downlink signal, such as a measurement gap, and to adjust the first retransmission-monitoring interval, add an additional retransmission-monitoring interval, or both, responsive to said detecting.

12 Claims, 4 Drawing Sheets

(56) References Cited

U.S. PATENT DOCUMENTS

| | | | |
|---|---|---|---|
| 2009/0059854 | A1 | 3/2009 | Nishio et al. |
| 2010/0034126 | A1 | 2/2010 | Kitazoe et al. |
| 2010/0034158 | A1 | 2/2010 | Meylan |
| 2010/0113055 | A1 | 5/2010 | Iwamura et al. |
| 2010/0284360 | A1 | 11/2010 | Dalsgaard et al. |
| 2011/0182247 | A1* | 7/2011 | Chun et al. .................. 370/329 |

OTHER PUBLICATIONS

Panasonic, "Relation between DRX and Gap for Measurement", 3GPP TSG WG2 #60, Jeju, Korea, Nov. 5, 2007, pp. 1-3, R2-074856, 3GPP.

Ericsson, "DRx and VOIP", 3GPP TSG WG2 #59, Athens, Greece, Aug. 20, 2007, pp. 1-3, R2-073208, 3GPP.

Nokia, et al., "Measurement Gaps", 3GPP TSG WG2 #60, Jeju, Korea, Nov. 5, 2007, p. 1, R2-075429, 3GPP.

Nokia Corporation, "Measurement Gaps and DRX Timers", 3GPP TSG-RAN2 Meeting #64, Prague, Czech Republic, Oct. 10, 2008, pp. 1-2, 36.321 CR NUM Change Request, R2-086085, 3GPP.

Alcatel-Lucent, et al., "Measurement Gaps and Semi-persistent Scheduling", 3GPP TSG-RAN2 WG2 #63bis, Prague, Czech Republic, Sep. 29, 2008, pp. 1-4, R2-085018, 3GPP.

European Telecommunications Standards Institute, "LTE; Evolved Universal Terrestrial Radio Access (E-UTRA); Medium Access Control (MAC) protocol specification", Technical Specification, ETSI TS 136 321 V8.3.0, pp. 1-38, 3GPP TS 36.321 version 8.3.0 Release 8, ETSI.

3rd Generation Partnership Project, "3rd Generation Partnership Project; Technical Specification Group Radio Access Network; Evolved Universal Terrestrial Radio Access (E-UTRA) Radio Resource Control (RRC); Protocol specification (Release 8)", Technical Specification, 3GPP TS 36.331 V8.3.0, Sep. 1, 2008, pp. 1-178, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 8)", Technical Specification, 3GPP TS 36.213 V8.4.0, Sep. 1, 2008, pp. 1-60, 3GPP, France.

* cited by examiner

METHOD FOR IMPROVING BATTERY LIFE AND HARQ RETRANSMISSIONS IN WIRELESS COMMUNICATIONS SYSTEMS

This application is a continuation of U.S. patent application Ser. No. 13/124,475 filed Apr. 15, 2011, which is a national stage application of PCT/SE2009/050191, filed Feb. 20, 2009, which claims the benefit of U.S. Provisional Application Ser. No. 61/106,337, filed Oct. 17, 2008, the disclosures of each of which are incorporated herein by reference in their entirety.

TECHNICAL FIELD

The present invention generally relates to wireless communication systems, and particularly relates to discontinuous reception and retransmission techniques for use in such systems.

BACKGROUND

The 3rd-Generation Partnership Project (3GPP) is continuing development of a next-generation wireless communication system in its Long-Term Evolution (LTE) initiative. In particular, 3GPP work is ongoing for defining specifications for a so-called Evolved Universal Terrestrial Radio Access Network (E-UTRAN).

The 3GPP RAN2 working group has defined a Discontinuous Reception (DRX) mechanism in the Medium Access Control (MAC) protocol specifications for LTE systems, which are currently documented as "3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321. The purpose of DRX is to reduce user equipment (UE) power consumption to save resources and extend battery life. With DRX, the UE can turn on and off reception of Layer1/Layer2 control messages while in RRC_CONNECTED state, i.e., when the UE has established a Radio Resource Control (RRC) connection with the serving network.

A central principle in DRX is that a UE's behavior depends on whether the Physical Downlink Control Channel (PDCCH), which carries UE-specific resource grants for both uplink and downlink resources, is successfully decoded by the UE. When in DRX mode, the UE is allowed to frequently stop monitoring the PDCCH, during intervals governed by several timers. A similar DRX mechanism is used for both the uplink (UL) and the downlink (DL).

Network-initiated mobility (which includes, for example, network-initiated handovers) is another aspect of Radio Resource Control. Details of Radio Resource Control for LTE systems are defined in "3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331. When a UE is in RRC_CONNECTED mode, i.e., once the UE has an established the RRC connection, the network controls UE mobility, deciding when the UE shall move to which cell, which may be on another frequency or even for another radio access technology (RAT). The network triggers the handover procedure based on factors including radio conditions, network loading, and the like. To facilitate mobility decisions, the network may configure the UE to perform measurement reporting, possibly including the configuration of measurement gaps, but may also initiate handover blindly, i.e., without having received measurement information from the UE.

SUMMARY

When configured, measurement gaps take priority over other receiver tasks. As a result, these measurement gaps, which may be specified, for example, with periodicity of 40 milliseconds or 80 milliseconds and with a length of six to seven milliseconds, are likely to occasionally collide (i.e., at least partly overlap) with hybrid automatic repeat request (HARQ) retransmissions, especially for real-time services that use Radio Link Control (RLC) Unacknowledged Mode (UM), such as Voice-over-IP (VoIP).

As specified in the LTE Medium Access Control (MAC) protocol specifications 3GPP TS 36.321, when a transmission takes place, the DRX Retransmission Timer is started after one HARQ Round Trip Time (RTT), whether or not the transmission was successful. This approach addresses the case of ACK-to-NACK errors, which would otherwise result in repeated unnecessary retransmissions. While the DRX Retransmission Timer is running, the UE monitors PDCCH for control information for an adaptive HARQ retransmission. For downlink transmissions, in the event that no PDCCH is received while the DRX Retransmission Timer is running, the UE is not required to listen for further retransmission attempts, according to the MAC protocol specifications. However, this approach fails to adequately account for either of two failure mechanisms. First, the UE may fail to successfully decode control signaling (i.e., a missed PDCCH message, which may occur with a probability as high as 1%), even when it is expecting a HARQ retransmission due to a previously transmitted "NACK." Second, the "awake" interval defined by the DRX Retransmission Timer may collide, either partially, or fully, with a measurement gap, during which the UE does not monitor PDCCH. In either of these cases, the UE is not mandated to listen for further retransmission attempts under the specifications.

One approach to this problem is to simply configure the DRX Retransmission Timer to a value spanning more than one HARQ RTT (i.e. up to 16 ms or 24 ms), so that if one retransmission interval is missed, then the next one is monitored. However, this approach results in unnecessary monitoring of PDCCH and decreased power savings for the UE. An alternative approach, as disclosed in detail herein, is for the UE to detect the occurrence of a collision between a measurement gap and a retransmission-monitoring interval and to modify the period during which it is required to monitor the PDCCH by adjusting the retransmission-monitoring interval, adding an additional retransmission-monitoring interval, or both, in response to detecting the collision.

Accordingly, in various embodiments of the present invention, one or more of the following techniques are used. In a first approach, in the event of a collision between a measurement gap (or other previously scheduled radio activity during which the receiver is unavailable to monitor the PDCCH) and the DRX Retransmission Timer, the time during which the UE does not monitor PDCCH due to another activity by the UE is simply excluded from the DRX Retransmission Timer. Thus, the DRX Retransmission Timer is temporarily suspended, if it is already running at the beginning of the measurement gap. If the DRX Retransmission Timer is scheduled to begin during a measurement (i.e., if the HARQ RTT Timer expires during a measurement gap), then the initiation of the DRX Retransmission Timer is deferred until the measurement gap is concluded. The effect of this first approach is to extend the retransmission-monitoring time by a duration that is approximately equal to the overlap between the originally scheduled retransmission-monitoring interval and the measurement gap.

According to a second general approach, the HARQ RTT Timer and/or the DRX Retransmission Timer may be restarted according to one or more of the following procedures: (a) The DRX Retransmission Timer is restarted at every RTT interval until either the UE successfully decodes an indicated transmission (e.g., the UE sends HARQ ACK) or until the maximum number of retransmissions (e.g., 8) is reached. (b) The HARQ RTT Timer or the DRX Retransmission Timer is restarted after the end of an activity performed by the UE which prevents the UE from monitoring PDCCH (e.g., a measurement gap). In some embodiments, the DRX Retransmission Timer (or HARQ RTT Time) is restarted immediately after the gap is concluded. In others, the HARQ RTT Timer or the DRX Retransmission Timer is restarted after a fixed or configurable time offset following the end of the activity performed by the UE which prevents the UE from monitoring PDCCH. (c) The HARQ RTT Timer or the DRX Retransmission Timer is restarted after a configurable amount of time (i.e., a configurable time offset) after the expiration of a HARQ RTT Timer, such as the expiration of a HARQ RTT Timer that corresponds to a collision (or, equivalently, after the start of the DRX Retransmission Timer that was collided with).

In yet another general approach, a new timer is used. When this new timer is active, DRX operation is suspended; when this timer expires, DRX operation is resumed (meaning the UE can either stop monitoring PDCCH or continue to do so, depending on other timers governing DRX operation). In the event of a collision between a measurement gap and a DRX Retransmission Timer, this timer can be started either: (a) immediately after the end of the activity performed by the UE which prevents the UE from monitoring PDCCH (e.g. a measurement gap); or (b) after a fixed or configurable amount of time after the end of the activity performed by the UE which prevents the UE from monitoring PDCCH (e.g. a measurement gap); or (c) after a fixed or configurable amount of time after the expiration of the HARQ RTT Timer (or equivalently after the start of the DRX Retransmission Timer).

An exemplary method may be implemented in a wireless communications device having a DRX mode in which the device's receiver is configured to monitor a first downlink signal during a series of regularly scheduled awake intervals and to monitor the first downlink signal for retransmissions during retransmission-monitoring intervals scheduled at a first predetermined delay from each detected data transmission to the receiver. This method includes detecting that a first retransmission-monitoring interval overlaps a previously scheduled radio activity during which the receiver is unavailable to monitor the first downlink signal and adjusting the first retransmission-monitoring interval, adding an additional retransmission-monitoring interval, or both, responsive to said detecting. The previously scheduled radio activity in some embodiments comprises a pre-configured measurement gap during which the receiver is scheduled to perform measurements of at least a second downlink signal.

Embodiments of the present invention thus include methods, such as might be implemented at an LTE UE, for starting/re-starting one or more DRX timers according to one or more of the above-described techniques and activating receiver operations accordingly. In some embodiments, adjusting the first retransmission-monitoring interval may comprise extending the first retransmission-monitoring interval for a duration approximately equal to the overlap between the first retransmission-monitoring interval and the previously scheduled radio activity. In others, adjusting the first retransmission-monitoring interval may comprise extending the first retransmission-monitoring interval to terminate at a pre-determined offset from the end of the previously scheduled radio activity. These or other embodiments may include adding a first additional retransmission-monitoring interval that commences at a second pre-determined delay from the beginning of the first retransmission-monitoring interval; the second pre-determined delay may be approximately equal to the first pre-determined delay, e.g., equal to the HARQ round-trip time. Other embodiments may add a first additional retransmission-monitoring interval that commences at a third pre-determined delay from the end of the previously scheduled radio activity. Still other embodiments may further comprise scheduling further retransmission-monitoring intervals until a retransmission is successfully received or until a pre-determined maximum number of retransmission-monitoring intervals is reached, whichever occurs first.

Those skilled in the art will appreciate that various embodiments of the invention make it possible to improve battery saving for real-time services, especially in loaded systems for coverage-limited UEs, without adversely impacting packet loss rates for the service. The use of the techniques disclosed herein may thus reduce or eliminate unnecessary tradeoffs between battery usage and the number of lost packets, which in loaded systems for coverage-limited UEs may result in degraded service and/or less capacity. Although the description herein is generally focused on collisions between a measurement gap and a DRX Retransmission Timer, those skilled in the art will appreciate that the techniques described herein may be applied to other scenarios in which a UE does not or cannot monitor the PDCCH during a DRX retransmission interval. Further, those skilled in the art will appreciate that the techniques described here in the context of an LTE system may be applied to other communication systems employing a DRX mode.

Of course, those skilled in the art will appreciate that the present invention is not limited to the above contexts, benefits, or specific examples, and will recognize additional features, contexts, and advantages upon reading the followed detailed description and upon viewing the accompanying drawings.

DETAILED DESCRIPTION

In much of the discussion that follows, various embodiments and aspects of the present invention are described in the context of a Long-Term Evolution (LTE) system, as currently under development by members of the 3$^{rd}$-Generation Partnership Project (3GPP). Of course, those skilled in the art will appreciate that the techniques and apparatus disclosed herein may be applied to or adapted for other wireless systems that utilize a discontinuous receive mode.

The use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement unless the context clearly indicates otherwise.

Figure 1:
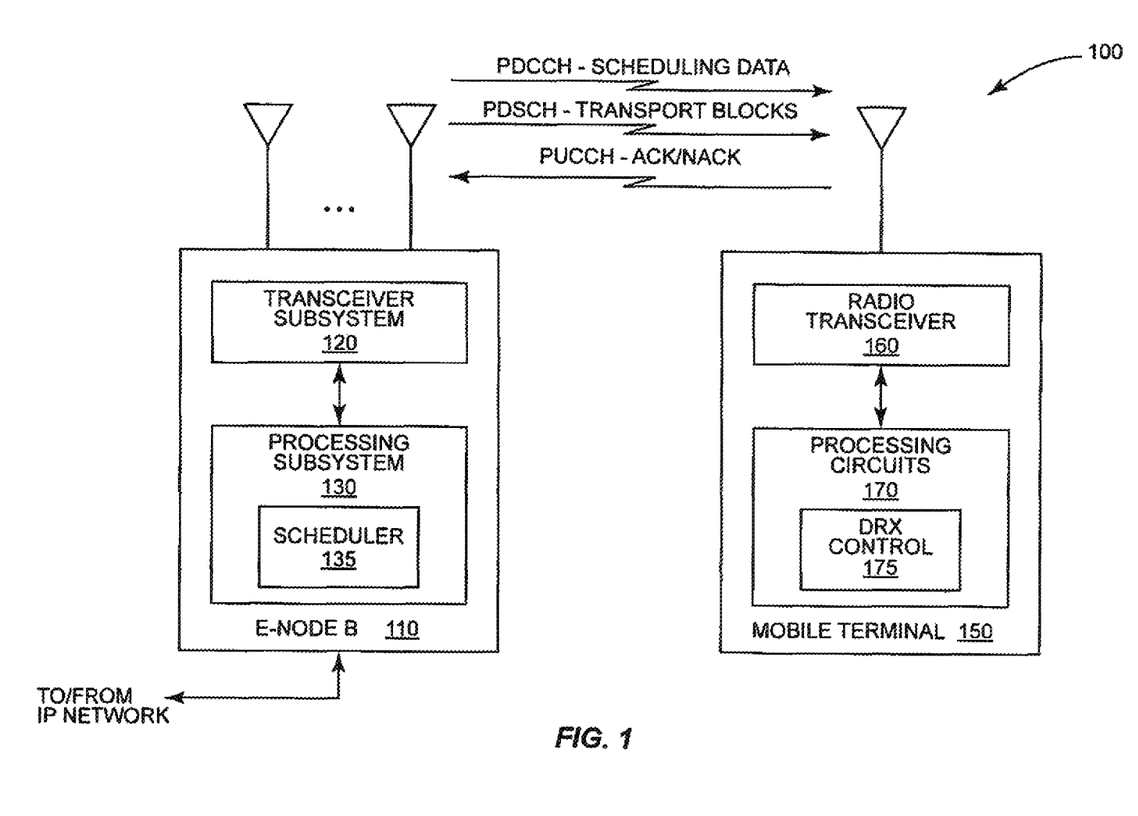
FIG. 1 is a block diagram of an exemplary wireless communication network, including a base station and mobile terminal configured according to some embodiments of the invention.

FIG. 1 provides a simplified view of a wireless communication system 100 according to some embodiments of the present invention. Wireless system 100 includes a base station 110, which may be a LTE evolved Node B (eNodeB) as generally specified by 3GPP, as well as a mobile terminal 150. Mobile terminal 150 is configured to operate according to one or more wireless communication protocols, including one or more protocols supported by base station 110. Base station 110 includes a transceiver subsystem 120 for sending and receiving data to and from mobile terminal 150 and a processing subsystem 130 for implementing wireless communication protocol functions, including protocol layers such as the MAC, RLC, and PDCP (Packet Data Convergence Protocol) layers. Processing subsystem 130 also includes a scheduler 135, which allocates uplink and downlink resources to mobile stations based on factors such as data throughput requirements, quality-of-service requirements, network loading, etc. In an LTE system, downlink (base station-to-mobile) data is transmitted in the form of "transport blocks" on the Physical Downlink Shared Channel (PDSCH), according to scheduling data sent on the Physical Downlink Control Channel (PDCCH). Error control data, in the form of ACK/NACK bits, is transmitted on the uplink (mobile-to-base station) in response, using the Physical Uplink Control Channel (PUCCH). Mobile terminal 150 thus includes a radio transceiver 160, adapted for communication with base station 110, as well as a processing unit 170. Processing circuits 170 are configured to implement the UE end of a wireless communication protocol, including protocol layers such as the MAC, RLC, and PDCP (Packet Data Convergence Protocol) layers. In particular, processing circuits 170 include a DRX control function 175, which controls radio transceiver operation in one or more DRX modes, such as the DRX mode specified in the LTE MAC protocol specifications.

Those skilled in the art will appreciate that the block diagram of FIG. 1 necessarily omits numerous features that are not necessary to a complete understanding of the invention. Although the details of processing system 130 and processing circuits 170 are not pictured, those skilled in the art will recognize that each may comprise one or several general-purpose or special-purpose microprocessors or other microcontrollers programmed with suitable software and/or firmware to carry out one or more of the methods and techniques described herein. Each may further comprise various digital hardware blocks configured to carry out various signal processing tasks, and each may include or may be implemented with one or more application-specific integrated circuits (ASICs), off-the-shelf digital and analog hardware components, or some combination of ASICs and off-the-shelf hardware. Thus, all of the described steps or procedures of any of the methods or techniques described herein may be performed in a single processing device in some embodiments, or split between two or more processing devices in others.

Viewing mobile terminal 150 from the perspective of a communications protocol framework, the radio transceiver 160 embodies a portion of Layer 1 (the physical layer, or "PHY" layer), while the processing circuits 170 embody the remainder of Layer 1 as well as functions of Layer 2 (data link layer) and Layer 3 (network layer). Thus, processing circuits 170 may embody an application layer, a network layer, and a radio link control (RLC) entity, each of which may be configured to operate according to one or more conventional communications standards. Processing circuits 170 further embody a medium access control (MAC) function, which is coupled to a physical layer control function; DRX operation is controlled by these two functions in some embodiments. Those skilled in the art will appreciate that each of these functional layers may be implemented in processing circuits 170 by means of one or more microprocessors or microcontrollers executing program code, or by using one or more appropriately configured hardware blocks, or with some combination thereof.

Of course, the detailed operation of the RLC entity, MAC function, and PHY layer control function will vary depending on the standard or standards supported by a given wireless communication device. Details of the 3GPP LTE requirements for operation of the PHY and MAC layers are given in the 3GPP documents: "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, and "3rd Generation Partnership Project; Technical Specification Group Radio Access Network; Evolved Universal Terrestrial Radio Access (E-UTRA); Physical Layer Procedures (Release 8)", 3GPP TS 36.213, respectively. An overall description of the LTE radio access network is provided in "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300.

Figure 2:
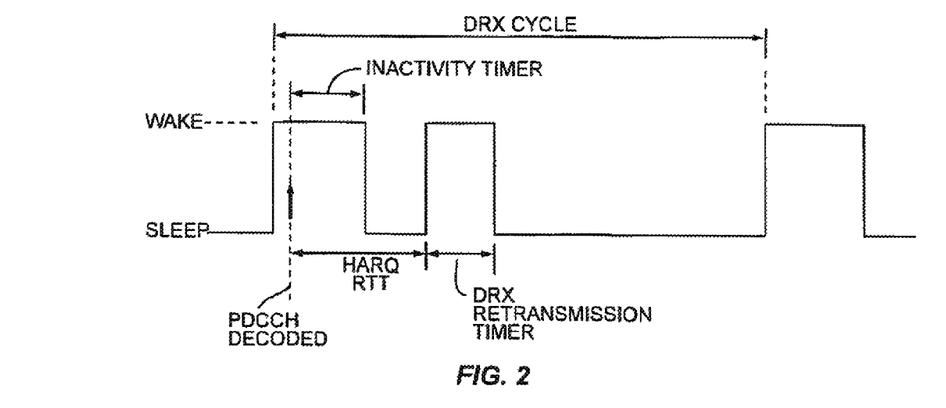
FIG. 2 is a timing diagram illustrating wake and sleep intervals for an exemplary discontinuous receive (DRX) cycle.

As briefly discussed above, operation in DRX mode (which is generally controlled by the Medium Access Control, or MAC, protocol layer in many systems) is configured by upper layers, i.e., protocol layers above the MAC, such as the Radio Resource Control layer. A mobile terminal operating in DRX mode can be configured to use one of two cycles at a given time, a long DRX cycle and short DRX cycle. A simplified illustration of one such cycle is provided in FIG. 2. At the beginning of each DRX cycle, the UE is "awake", as shown in FIG. 2, and monitors the PDCCH for an interval equal to at least a pre-determined number of transmission-time intervals (TTIs). In the E-UTRA standards, this interval is referred to as the DRX on-duration period, which is controlled by the DRX On Duration timer. If no message for the mobile terminal is decoded from the PDCCH during the on-duration period, then the mobile terminal goes to "sleep" for the remainder of the cycle. Configuration of the short DRX cycle is optional, and its length is always an integer fraction of the length of the long DRX cycle. When short cycle operation is configured, a transition from the short cycle to the long cycle occurs after a pre-determined period of consecutive subframes for which the UE has not been scheduled using the PDCCH, which period is defined by the DRX short cycle timer. Thus, at the beginning of each cycle, the UE start the DRX On Duration timer and monitors the PDCCH.

The beginning of the cycle is based on the system frame number (SFN), specified as an integer offset. Specifically, from 3GPP TS 36.321: "When a DRX cycle is configured, the UE shall for each subframe: start the On Duration Timer when [(SFN*10)+subframe number] modulo (current DRX Cycle)= DRX Start Offset."

The PDCCH carries downlink assignments as well as uplink resource grants. Whether the UE remains awake (i.e., its receiver is monitoring the PDCCH) or goes to sleep after the DRX on-duration period depends on activity detected during the period, such as the possible reception of PDCCH control data. When the UE successfully decodes a PDCCH assignment or grant, as shown in FIG. 2, it starts (or restarts) a DRX inactivity timer, which extends the time during which the UE further monitors the PDCCH before returning to sleep. This event also triggers the start of a HARQ Round-Trip Time (RTT) timer, as shown in FIG. 2; the expiration of the HARQ RTT timer triggers the initiation of yet another timer, the DRX Retransmission Timer, again as shown in FIG. 2. The UE must wake back up when the DRX Retransmission Timer is active, to monitor the PDCCH for a retransmission related to the original PDCCH transmission.

Although DRX behavior may vary from one system to another, behavior within a given system must be according to a precise set of rules, to ensure that the base station (e.g., the LTE eNodeB) and the UE are synchronized with respect to the timing of the UE's sleep and awake states. Because the base station and UE operate similar timers and have shared knowledge of the beginning times for the DRX cycles, the precise state of the UE does not have to be signaled explicitly between the base station and the UE. For LTE, these rules for UE behavior in DRX are defined in 3GPP TS 36.321, and include the following features:

- The same DRX mechanism is used for both the uplink and the downlink.
- The UE may optionally be configured with a short DRX cycle, the length of which is a full fraction of the long DRX cycle time. In other words, the length of the long DRX cycle is an integer multiple of the short DRX cycle time.
- An On Duration Timer at the beginning of each cycle defines a minimum time during which the UE monitors the PDCCH, i.e., is "awake."
- If UE does not decode the PDCCH successfully during the On Duration Timer interval, i.e., if there is no control data targeted to the UE, then the UE goes to sleep for the remainder of the current cycle. Otherwise, if PDCCH indicates a downlink transmission for the UE then the UE shall start or restart a DRX Inactivity Timer, independently of whether or not the transmission succeeded. The UE also starts a HARQ RTT (Round Trip Time) Timer for a corresponding HARQ (hybrid automatic repeat request) process, and switches to the short cycle (if currently in the long cycle and if the short cycle is configured). Use of the short cycle is stopped when Short DRX Cycle Timer is expired.
- At expiration of a HARQ RTT timer, the UE starts a Retransmission Timer for the corresponding HARQ process.
- At a given transmission time interval (TTI), if at least one of the On Duration Timer, Inactivity Timer, or Retransmission Timer is running, then the UE should be awake, and monitor the PDCCH. Otherwise, the UE may be asleep.

As noted above, control of mobility (e.g., handoffs) is another aspect of RRC control in a cellular system. Network-initiated mobility for LTE systems is defined in 3GPP TS 36.331. When a UE is in RRC_CONNECTED mode, i.e., once the UE has an established the RRC connection, the network controls the UE's mobility. The network thus decides if and when the UE shall move to another cell, which may be on another frequency or radio access technology (RAT). The network triggers the handover procedure e.g. based on radio conditions, load, and the like. To facilitate this, the network may configure the UE to perform measurement reporting (possibly including the configuration of measurement gaps). The network may also initiate handover blindly, i.e. without having received measurement information from the UE.

More specifically, an LTE network initiates mobility of a UE in RRC_CONNECTED state, possibly in response to a "MeasurementReport" message received from the UE, by sending a "MobilityFromEUTRACommand" message to the UE. This procedure is only initiated after security has been activated. (See 3GPP TS 36.331 for details).

As part of RRC control, 3GPP TS 36.331 specifies measurement configuration (i.e., network control of UE measurement tasks). Measurement gaps are periods that the UE may use to perform measurements. Because the UE's radio circuits must often be tuned to different frequencies to perform these measurements, no uplink or downlink transmissions are generally scheduled. The current agreement in 3GPP for LTE systems is that a UE is always configured with a measurement gap pattern when inter-frequency or inter-RAT measurements need to be performed, such as when serving cell quality drops below a configured threshold. The measurement gap pattern is characterized by a gap length (e.g., 6 ms) and by a gap period (e.g., 40 ms or 80 ms).

The network may configure a particular active gap pattern, using RRC, when it configures a UE for measurements. Once a UE has been configured for measurements, the gaps are always activated. During these gaps, the UE is unable to monitor PDCCH or any other downlink shared channels, and the UE does not make any uplink transmissions on UL-SCH.

The network provides the measurement configuration by means of dedicated signaling (on a signaling radio bearer). Measurements for LTE are further described in section 5.5 of 3GPP TS 36.331. In particular, a number of measurement types are defined, including:

- Intra-frequency measurements—measurements at the downlink carrier frequency of the serving cell;
- Inter-frequency measurements—measurements at frequencies that differ from the downlink carrier frequency of the serving cell;
- Inter-RAT measurements of UTRA frequencies;
- Inter-RAT measurements of GERAN frequencies; and
- Inter-RAT measurements of CDMA2000 HRPD or 1xRTT frequencies.

A measurement is generally configured with a reporting criterion and format. The reporting criteria define the event or events that trigger the UE to send a measurement report. The reporting criteria may specify periodic reporting and/or one or more event descriptions. The reporting format defines, inter alia, the quantities that the UE includes in the measurement report and associated information (e.g. number of cells to report). When a measurement has been triggered and the UE has performed the required measurement during the gap, the UE assembles a measurement report and transmits the "MeasurementReport" message to the base station on a signaling radio bearer.

Figure 3:
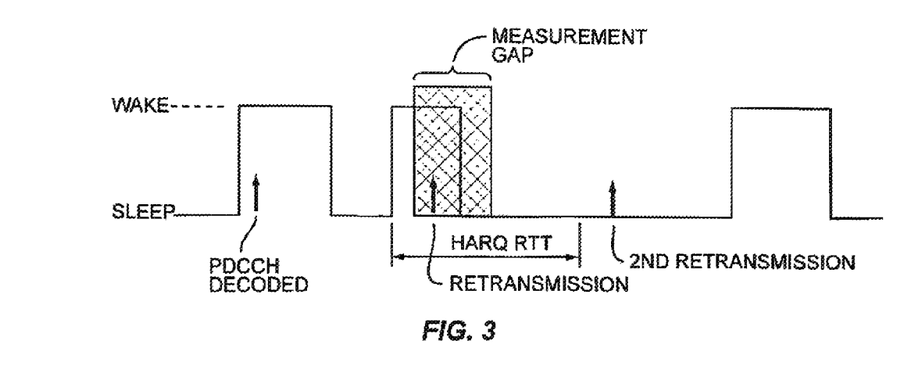
FIG. 3 is a timing diagram illustrating the collision of a measurement gap with a retransmission-monitoring interval.

As noted above, a problem with the previously specified approach to DRX in LTE is that collisions between measurement gaps (periodicity of 40 or 80 milliseconds, with lengths of 6 to 7 milliseconds) and HARQ retransmissions will some-times occur, especially for real-time services that use Radio Link Control (RLC) Unacknowledged Mode (UM), such as Voice-over-IP (VoIP) (periodicity of 20 ms or 40 ms with HARQ RTT of 8 ms). FIG. 3 illustrates such a collision between a measurement gap and a re-transmission monitoring interval. At the beginning of the cycle, a PDCCH message targeted to the UE is detected, during the initial On Duration Timer. This triggers the initiation of a HARQ RTT timer (just as in FIG. 2), so that the UE wakes up again to monitor the PDCCH for a retransmission. However, in the scenario pictured in FIG. 3, a measurement gap begins shortly after the retransmission-monitoring interval begins, preventing the UE from receiving the retransmission on the PDCCH. As a result, the HARQ RTT timer is not restarted, the UE goes back to sleep, and a second retransmission is not detected by the UE.

In LTE, adaptive HARQ retransmissions are indicated by the eNodeB to the UE using PDCCH. All retransmissions on the downlink are adaptive (i.e., explicitly scheduled by a PDCCH grant), while the uplink HARQ mechanism supports synchronous non-adaptive retransmissions as well as explicitly scheduled adaptive retransmissions. As currently specified by 3GPP, when a transmission takes place, the DRX Retransmission Timer is started after one HARQ RTT, independently of whether the transmission was successful. This approach addresses the case of ACK-to-NACK errors, which would otherwise trigger repeated unnecessary retransmissions. While the DRX Retransmission Timer is running, the UE monitors the PDCCH for a message scheduling an adaptive retransmission. For the downlink, in the event that no PDCCH is received while the DRX Retransmission Timer is running, then the UE is not required to listen for further retransmission attempts. This causes a problem when, for example, the UE fails to successfully decode control signaling (the probability of a missed PDCCH message may be 1% in some systems). Accordingly, even if the UE is expecting a retransmission (e.g., after transmitting a NACK), the current specifications do not ensure a further opportunity to listen for further retransmission attempts. Similarly, the current specifications do not provide further opportunities to monitor the PDCCH for retransmission attempts in the event that a measurement gap coincides with the normal DRX retransmission interval.

One possible solution to ensure that the UE monitors the PDCCH for at least one additional retransmission interval in the event of a signaling error (i.e., missed PDCCH) is simply to configure the DRX Retransmission Timer to a value spanning more than one HARQ RTT interval. Thus, for example, the DRX Retransmission Timer may be configured to 16 ms or 24 ms, for a HARQ RTT interval of 8 ms.

One possible approach to solving the problem of collisions between measurement gaps and retransmission intervals is to configure the DRX Retransmission Timer so that it specifies an "on" interval that is certain to be longer than the maximum gap length (e.g., more than 7 ms). With this approach, because the eNodeB is aware of the collision between a measurement gap and the DRX Retransmission Timer, a PDCCH message can always be scheduled at a time when the UE is sure to be monitoring the PDCCH.

3GPP standards currently specify that the DRX Retransmission Timer may be configured to equal 1, 2, 4, 6, 8, 16, 24 or 33 subframes; the longest of these retransmission-monitoring intervals are longer than the maximum gap length. However, in certain scenarios, it may not be desirable to configure the DRX Retransmission Timer to a value larger than a few subframes. For example, consider a real-time service, such as VoIP, for which a 1% packet loss rate is acceptable, given a specific delay budget. The spacing between packets in such a service may be on the same order as the periodic spacing between measurement gaps. Because this type of service is characterized by frequent, but small, packets, it is desirable to provide as many opportunities as possible for the UE to sleep between transmissions. Thus a small value of the DRX Retransmission Timer is desirable, since a single extra subframe of sleep between transmissions can represent 5% battery savings when the service is active.

Consider also a system configuration in which a UE might miss about 1% of PDCCH assignments. When DRX is not configured, if a PDCCH is missed for a particular retransmission, or if a retransmission collides with a measurement gap, the eNodeB can always make a subsequent attempt after the next RTT, so the consequence is only added delay, not necessarily additional packet losses. When such a system is loaded with many users, the packet loss rate can be maintained at a level to approximate 1%, in order to keep as many satisfied users as possible. The situation changes, however, when DRX is configured. In a loaded system with DRX configured, missed PDCCH assignments lead to a packet loss. As a result, either the total packet loss rate will go beyond the acceptable limit (e.g., more than 1%) or the system will have to compensate by reducing the number of served users.

In a coverage limited situation, while it is possible that many transmissions succeed at the first transmission, UEs located at or near the cell-edge will likely experience an increase in the number of retransmissions needed for each transmission. This is also the scenario in which a UE is mostly likely to be configured to perform measurements, using configured gaps. The collisions between the measurement gaps and PDCCH measurements scheduling retransmissions further increase the rate of packet loss. It is thus desirable to find a solution to reduce the number of unsuccessful transmissions due to failure to complete retransmissions because of a missed PDCCH assignment or because of a collision with a gap.

As suggested above, some embodiments of the present invention address this problem by extending or reconfiguring the period during which the UE is required to monitor the PDCCH. This is done in some embodiments of the invention by excluding from the running of the DRX Retransmission Timer the time during which the UE does not monitor PDCCH, due to another activity by the UE. In other words, the re-transmission monitoring interval is extended by a period approximately equal to the overlap between the originally scheduling retransmission-monitoring period and the task that prevents PDCCH monitoring (e.g., a measurement gap). In these embodiments the DRX Retransmission Timer is suspended for the duration of a measurement gap, for example, if the measurement gap begins during the retransmission time interval. If a DRX Retransmission Timer is scheduled to begin in the middle of a measurement gap (i.e., if the HARQ RTT Timer expires during a measurement gap) then the start of the DRX Retransmission Timer is deferred until the measurement gap ends.

In other embodiments, additional restarts of the HARQ RTT Timer and/or the DRX Retransmission Timer are triggered. In other words, one or more additional re-transmission monitoring intervals are added, such as according to one of the following scenarios:

(a) The DRX Retransmission Timer is started after every RTT until the UE successfully decodes the transmission (e.g. the UE send HARQ ACK) or until the maximum number of retransmissions is reached. In other words, the HARQ RTT Timer is restarted each time the UE fails to successfully decode a downlink transport block or fails to decode a PDCCH assignment when one is expected, such as after transmitting a NACK. This restarting may be terminated, in some embodiments, when a maximum number of retransmissions (e.g., eight) is reached.

(b) The DRX Retransmission Timer is started after a fixed or configurable amount of time after the end of the activity performed by the UE which prevents the UE from monitoring PDCCH (e.g. a gap). This fixed or configurable amount of time may include zero; thus the DRX Retransmission Timer may be started immediately after the measurement gap ends, in some embodiments. In some embodiments, this technique may restart the HARQ RTT Timer at a fixed offset after the measurement gap ends, as the DRX Retransmission Timer is automatically started upon expiration of the HARQ RTT Timer.

(c) The DRX Retransmission Timer is restarted after a fixed or configurable amount of time after the expiration of a HARQ RTT Timer (or, equivalently, after the start of the DRX Retransmission Timer). In this manner, for example, the retransmission-monitoring interval can effectively be "rescheduled" to fall outside a measurement gap. Unlike the immediately previous approach, where the timing of the restarted DRX Retransmission Timer is related to the end of the measurement gap, the rescheduled retransmission-monitoring interval in this approach is related instead to the expiration of a HARQ RTT Timer.

In still other embodiments, a new timer is introduced. When this timer is active, the PDCCH is monitored. When this timer expires, DRX operation is resumed (meaning the UE can either stop monitoring PDCCH or continue to do so, depending on other timers governing DRX operation). In various embodiments, this timer is started either immediately after the end of the activity performed by the UE which prevents the UE from monitoring PDCCH (e.g. a measurement gap), or after a fixed or configurable amount of time after the end of the activity performed by the UE which prevents the UE from monitoring PDCCH (e.g. a gap), or after a fixed or configurable amount of time after the expiration of the HARQ RTT Timer (or equivalently after the start of the DRX Retransmission Timer).

Figure 4:
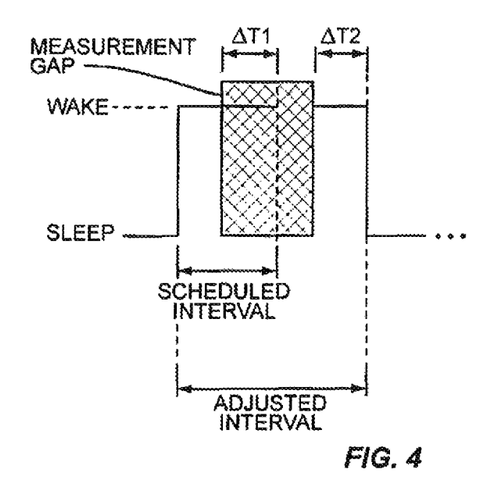
FIG. 4 is a timing diagram illustrating the extending of a scheduled retransmission-monitoring interval.

Several of the above-described techniques can be sorted into one of two categories. The first category includes those techniques in which an overlap is detected between a scheduled retransmission-monitoring interval and a previously scheduled radio activity (e.g., a measurement gap) during which the receiver is unable to monitor a downlink channel (e.g., the LTE PDCCH), and the retransmission-monitoring interval is adjusted in response. One such adjustment is shown in FIG. 4, which illustrates a measurement gap overlapping a scheduled retransmission-monitoring interval. The duration of the overlap is $\Delta T1$; in the pictured example the interval is adjusted by adding a duration of $\Delta T2$ to the retransmission-monitoring interval, beginning at the time the measurement gaps. In some embodiments, $\Delta T2$ may be controlled to be approximately equal to $\Delta T1$, so that the total time for which the receiver is actually available to monitor the downlink channel is approximately equal to the originally scheduled time. In other embodiments, $\Delta T2$ may be a pre-determined fixed quantity, such as a time corresponding to a fixed number of subframes. In the pictured example, $\Delta T2$ is referenced to the end of the measurement gap; those skilled in the art will appreciate that adjustments to the originally scheduled retransmission-monitoring interval may be referenced instead to the end of the original interval. In either event, the adjustment may be variable, e.g., based on the length of the overlap between the measurement gap and the original interval, or fixed, e.g., based on a hard-coded or network configurable offset value.

Figure 5:
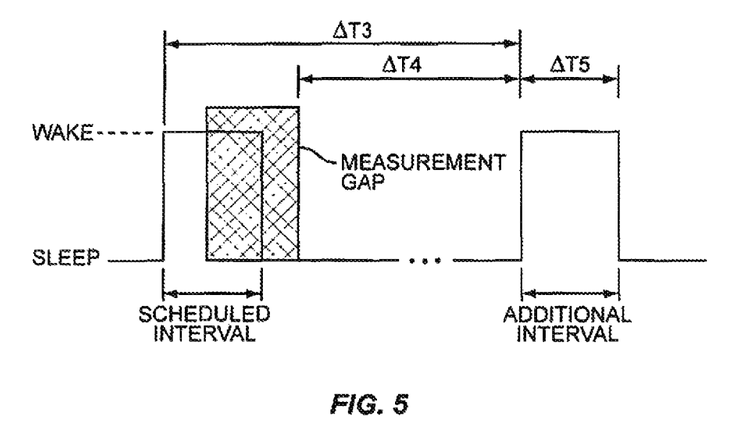
FIG. 5 is a timing diagram illustrating the addition of an additional retransmission-monitoring interval.

A second category of techniques includes those in which an overlap is detected between a scheduled retransmission-monitoring interval and a previously scheduled radio activity during which the receiver is unable to monitor a downlink channel, and an additional retransmission-monitoring interval is added. A timing diagram corresponding to one such approach is illustrated in FIG. 5. Again, a measurement gap overlaps a scheduled retransmission-monitoring interval. However, instead of extending the first retransmission-monitoring interval, an additional interval is added. As seen in FIG. 5, the beginning of this interval might be referenced to the beginning of the original interval, in some embodiments. As pictured, the additional retransmission-monitoring interval begins at a delay of $\Delta T3$ from the beginning of the first retransmission-monitoring interval; $\Delta T3$ may be equal to the HARQ Round-Trip Time in some embodiments, but might be set to a different value in others. Alternatively, the start of the additional retransmission-monitoring interval might be referenced to the end of the interfering activity. Thus, as shown in FIG. 5, the additional retransmission-monitoring interval begins at a delay of $\Delta T4$ after the end of the measurement gap. Similarly, the duration of the additional retransmission-monitoring interval, $\Delta T5$, may be configured to be equal to the original retransmission-monitoring interval duration (e.g., equal to the DRX Retransmission Timer) in some embodiments, or to a different duration in others. Those skilled in the art will appreciate that any of the parameters $\Delta T3$, $\Delta T4$, or $\Delta T5$ may be pre-determined, e.g., by hard-coding, in some embodiments, or via network configuration (e.g., via RRC) in others.

Figure 6:
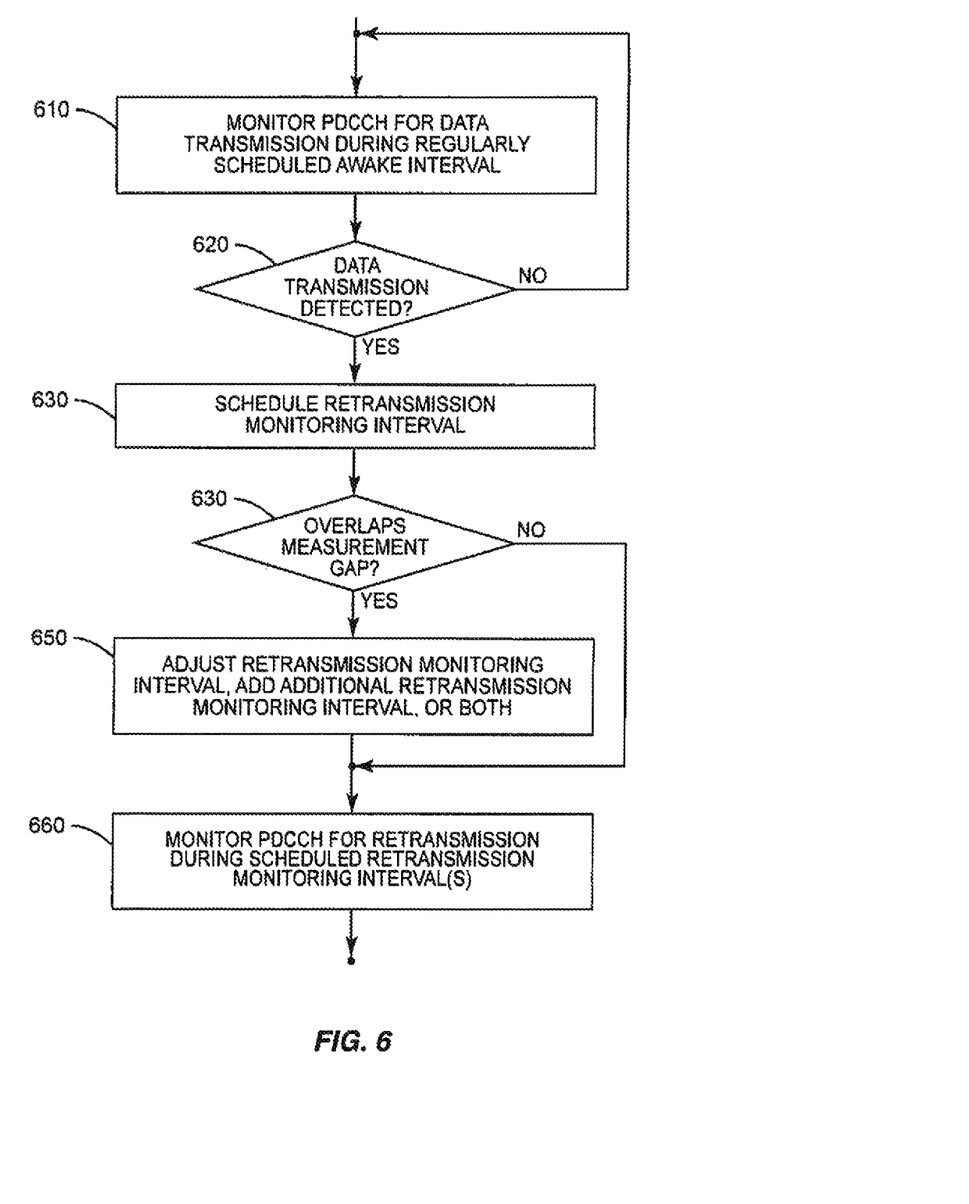
FIG. 6 is a process flow diagram illustrating an exemplary method for monitoring a downlink channel for data transmissions in a DRX mode.

FIG. 6 is a process flow diagram illustrating a general method for controlling DRX operation in a wireless communication device according to several of the techniques discussed above. The illustrated method is applicable when the device is configured for DRX operation; thus the method "begins" with the monitoring of the PDCCH (or other downlink channel) for data transmissions during regularly scheduled awake intervals, as shown at block 610.

If no data transmission targeted to the wireless device is detected, then the device continues to alternate between sleep and awake intervals, according to the configured DRX cycle. If a data transmission is detected, as shown at block 620, then a retransmission-monitoring interval is scheduled, as shown at block 630. As discussed above, this scheduling may comprise the initiation of a HARQ Round-Trip Timer, the expiration of which triggers the beginning of the re-transmission monitoring interval. Absent a collision between this scheduled interval and another, higher-priority task, this scheduled retransmission-monitoring interval may be controlled by a Retransmission Timer, with a duration that may be hard-coded or network-configurable.

As shown at block 630, the device checks to determine whether the scheduled retransmission-monitoring interval overlaps a measurement gap. If not, the PDCCH is monitored during the originally scheduled retransmission-interval, as shown at block 660. On the other hand, if a collision between the retransmission-monitoring and a measurement gap is detected, then the retransmission-monitoring interval is adjusted or an additional retransmission-monitoring interval is added, or both, as shown at block 660.

This adjustment of the retransmission-monitoring interval or adding of an additional retransmission-monitoring interval may be according to one or more of the earlier described techniques, in various embodiments. Thus, the first retransmission-monitoring interval may be extended for a duration approximately equal to the overlap between the first retransmission-monitoring interval and the measurement gap (or other higher-priority radio activity), in some embodiments. In others, the first retransmission-monitoring interval is extended so that it terminates at a pre-determined offset from the end of the previously scheduled radio activity. In other embodiments, an additional retransmission-monitoring interval that commences at a pre-determined delay from the beginning of the first retransmission-monitoring interval is added; in some of these embodiments this delay is approximately equal to the delay between an original transmission and a retransmission, e.g., the HARQ Round-Trip Time. In still others, an additional retransmission-monitoring interval that commences at a pre-determined delay from the beginning of the first retransmission-monitoring interval is added from the end of the previously scheduled radio activity is added. In any event, the duration of the additional retransmission-monitoring interval may be the same as that of the first retransmission-monitoring interval in some embodiments, or it may differ according to a pre-determined value.

Those skilled in the art will appreciate that two or more of the above techniques may be combined, or that one or more of the above techniques may be repeated. Thus, for example, some embodiments may include the scheduling of still further retransmission-monitoring intervals, in some cases until a retransmission is successfully received or until a pre-determined maximum number of retransmission-monitoring intervals is reached.

Those skilled in the art will appreciate that the techniques described herein may be implemented in a variety of wireless communication devices and systems, including the mobile terminal 150 and base station 110 discussed above. Those skilled in the art will further appreciate that the preceding descriptions of specific embodiments of methods and apparatus for carrying out discontinuous receive (DRX) operations in a communication system are given for purposes of illustration and example and will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless communications device having a discontinuous receive mode in which a receiver is configured to monitor a first downlink signal during a series of regularly scheduled awake intervals and to monitor the first downlink signal for retransmissions during retransmission-monitoring intervals scheduled at a first predetermined delay from each detected data transmission to the receiver, wherein the method comprises:

detecting that a first retransmission-monitoring interval overlaps a previously scheduled radio activity during which the receiver is unavailable to monitor the first downlink signal; and adjusting the first retransmission-monitoring interval, adding an additional retransmission-monitoring interval, or both, responsive to said detecting, wherein adjusting the first retransmission-monitoring interval, adding an additional retransmission-monitoring interval, or both, comprises adding a first additional retransmission-monitoring interval that commences at a second pre-determined delay from the beginning of the first retransmission-monitoring interval.

2. The method of claim 1, wherein the previously scheduled radio activity comprises a pre-configured measurement gap during which the receiver is scheduled to perform measurements of at least a second downlink signal.

3. The method of claim 1, wherein the second pre-determined delay is approximately equal to the first pre-determined delay.

4. The method of claim 3, further comprising scheduling further retransmission-monitoring intervals until a retransmission is successfully received or a pre-determined maximum number of retransmission-monitoring intervals is reached.

5. The method of claim 1, wherein the first additional retransmission-monitoring interval has a duration that differs from the duration of the first retransmission-monitoring interval.

6. A wireless communication device having a receiver configured to selectively operate in a discontinuous receive mode in which the receiver monitors a first downlink signal during a series of regularly scheduled awake intervals and monitors the first downlink signal for retransmissions during retransmission-monitoring intervals scheduled at a first predetermined delay from each detected data transmission to the receiver, wherein the wireless communication device comprises a control circuit configured to:

detect that a first retransmission-monitoring interval overlaps a previously scheduled radio activity during which the receiver is unavailable to monitor the first downlink signal; and adjust the first retransmission-monitoring interval, add an additional retransmission-monitoring interval, or both, responsive to said detecting, wherein the control circuit is configured to add a first additional retransmission-monitoring interval that commences at a second pre-determined delay from the beginning of the first retransmission-monitoring interval.

7. The wireless communication device of claim 6, wherein the previously scheduled radio activity comprises a pre-configured measurement gap during which the receiver is scheduled to perform measurements of at least a second downlink signal.

8. The wireless communication device of claim 6, wherein the second pre-determined delay is approximately equal to the first pre-determined delay.

9. The wireless communication device of claim 8, wherein the control circuit is configured to schedule further retransmission-monitoring intervals until a retransmission is successfully received or a pre-determined maximum number of retransmission-monitoring intervals is reached.

10. The wireless communication device of claim 6, wherein the first additional retransmission-monitoring interval has a duration that differs from the duration of the first retransmission-monitoring interval.

11. A method in a wireless communications device having a discontinuous receive mode in which a receiver is configured to monitor a first downlink signal during a series of regularly scheduled awake intervals and to monitor the first downlink signal for retransmissions during retransmission-monitoring intervals scheduled at a first predetermined delay from each detected data transmission to the receiver, wherein the method comprises:

detecting that a first retransmission-monitoring interval overlaps a previously scheduled radio activity during which the receiver is unavailable to monitor the first downlink signal; and adjusting the first retransmission-monitoring interval, adding an additional retransmission-monitoring interval, or both, responsive to said detecting, wherein adjusting the first retransmission-monitoring interval, adding an additional retransmission-monitoring interval, or both, comprises extending the first retransmission-monitoring interval for a duration approximately equal to the overlap between the first retransmission-monitoring interval and the previously scheduled radio activity.

12. A wireless communication device having a receiver configured to selectively operate in a discontinuous receive mode in which the receiver monitors a first downlink signal during a series of regularly scheduled awake intervals and monitors the first downlink signal for retransmissions during retransmission-monitoring intervals scheduled at a first predetermined delay from each detected data transmission to the receiver, wherein the wireless communication device comprises a control circuit configured to:

detect that a first retransmission-monitoring interval overlaps a previously scheduled radio activity during which the receiver is unavailable to monitor the first downlink signal; and adjust the first retransmission-monitoring interval, add an additional retransmission-monitoring interval, or both, responsive to said detecting, wherein the control circuit is configured to extend the first retransmission-monitoring interval for a duration approximately equal to the overlap between the first retransmission-monitoring interval and the previously scheduled radio activity, responsive to said detecting.

* * * * *